(12) United States Patent
Ording

(10) Patent No.: US 7,362,331 B2
(45) Date of Patent: Apr. 22, 2008

(54) TIME-BASED, NON-CONSTANT TRANSLATION OF USER INTERFACE OBJECTS BETWEEN STATES

(75) Inventor: Bas Ording, Sunnyvale, CA (US)

(73) Assignee: Apple Inc., Cupertino, CA (US)

(*) Notice: Subject to any disclaimer, the term of this patent is extended or adjusted under 35 U.S.C. 154(b) by 1288 days.

(21) Appl. No.: 09/754,147

(22) Filed: Jan. 5, 2001

(65) Prior Publication Data

US 2002/0089505 A1 Jul. 11, 2002

(51) Int. Cl.
*G06T 13/00* (2006.01)
(52) U.S. Cl. .................. 345/473; 345/474; 345/475; 345/427; 715/757; 715/759; 715/762; 715/781; 715/782; 715/799; 715/800
(58) Field of Classification Search ............... 345/792, 345/156–159, 473, 474, 798, 973, 672, 475, 345/722, 767, 769, 788, 795, 427; 715/798, 715/799, 800, 802, 803, 759, 761, 762, 765, 715/757, 781

See application file for complete search history.

(56) References Cited

U.S. PATENT DOCUMENTS

| | | | |
|---|---|---|---|
| 5,546,520 A | 8/1996 | Cline et al. | |
| 5,657,463 A | 8/1997 | Bingham | |
| 5,764,241 A * | 6/1998 | Elliott et al. ................ | 345/473 |
| 5,771,032 A | 6/1998 | Cline et al. | |
| 5,796,402 A * | 8/1998 | Ellison-Taylor ............ | 345/792 |
| 6,002,402 A | 12/1999 | Schacher | |
| 6,414,684 B1 * | 7/2002 | Mochizuki et al. ......... | 345/473 |

FOREIGN PATENT DOCUMENTS

JP 07 160428 A 6/1995

OTHER PUBLICATIONS

Animation: From Cartoons to the User Interface: ACM 0-89791-628-x/93/0011; Nov. 3-5, 1993; UIST'93).*
IBM TDB article ("Window Closing Animations": IBM Technical Disclosure Bulletin, US, IBM Corp, NY; Nov. 1, 1995; ISSN 0018 8689).*
Copending U.S. Appl. No. 09/467,074.
Copending U.S. Appl. No. 09/477,738.
"Window Closing Animations", IBM Technical Disclosure Bulletin, IBM Corp, New York, US, vol. 38, No. 11, Nov. 1, 1995, p. 13.

* cited by examiner

*Primary Examiner*—Kimbinh T. Nguyen
(74) *Attorney, Agent, or Firm*—Buchanan Ingersoll & Rooney PC

(57) ABSTRACT

The present invention relates to a method for moving objects within the graphical user interface (GUI) of an operating system in a manner that provides a transitional effect between window states, which is pleasing to the user. This transitional effect includes changing the shape of a window while scaling and moving the window between two different sizes and positions. In one embodiment of the present invention, the transitional effect may be employed as a window is minimized into an icon, or restored from an icon. In another embodiment of the present invention, the transitional effect is employed as a window is minimized within its title bar, or restored therefrom. The rate of movement of objects is controlled in a non-linear manner, to further enhance the pleasing effect.

28 Claims, 7 Drawing Sheets

TIME-BASED, NON-CONSTANT TRANSLATION OF USER INTERFACE OBJECTS BETWEEN STATES

This disclosure is based upon, and claims priority from, U.S. patent application Ser. No. 09/477,738, the contents of which are incorporated herein by reference.

FIELD OF THE INVENTION

The present invention relates generally to graphical user interfaces for computer systems. More particularly, the present invention relates to the movement of user-interface objects, such as icons and windows, within a graphical user interface of a computer operating system.

BACKGROUND OF THE INVENTION

An important aspect of virtually every conventional personal and business computer is the graphical user interface (GUI). The user primarily employs the GUI to interact with the computer. Typically, the GUI consists of a desktop containing various objects such as windows, icons, pull-down menus and pop-up menus. These various objects can be placed at different positions on the desktop. Such positioning can be performed manually, e.g. by dragging an object from one location to another. In other situations, the object can be automatically repositioned, in response to user actions.

In addition to repositioning, some types of objects can also be resized. For instance, a user may have numerous windows opened simultaneously. There may be an insufficient amount of space associated with the computer display to show each window in its entirety, as a result of which the display can become cluttered. To help keep the display appearance organized, the user can resize, reshape and/or reposition windows. An exemplary method for resizing a window is illustrated in U.S. Pat. No. 5,546,520 to Cline et al. Another exemplary method for modifying or resizing a window, as information is being scrolled, is described by U.S. Pat. No. 5,771,032 to Cline et al. An exemplary method for repositioning windows is illustrated in U.S. Pat. No. 5,657,463 to Bingham.

Another common technique that is employed with GUIs involves "minimizing" and "maximizing" windows. The technique of minimizing and maximizing windows involves resizing and repositioning windows. When minimizing a window, the window is reduced in size to a miniaturized representation of the larger or full-sized window, or to an icon representation. When maximizing a window, the window is enlarged from a miniaturized representation of the window, or an icon representation, to a larger or full-sized window. As one skilled in the art will readily appreciate, a user may initiate the process of maximizing or minimizing a window by selecting an on-screen button, typically associated with the window itself, or by depressing one or more keys on the keyboard.

With respect to manipulating windows (e.g., opening, closing, sizing, repositioning), conventional operating systems primarily focus on efficiency. However, operating systems do not focus on the aesthetics associated with these operations, particulary minimizing, maximizing and restoring operations. Accordingly, it would be desirable to provide more aesthetically pleasing operations, while continuing to provide all of the functionality associated with traditional techniques.

SUMMARY OF THE INVENTION

Based on the previous discussion, it is one objective of the present invention to provide an aesthetically pleasing visual effect when repositioning, resizing, or generally manipulating a displayed window.

It is another objective of the present invention to provide an aesthetically pleasing technique that assists the user in associating miniaturized or minimized windows with the corresponding enlarged or maximized windows.

It is another objective of the present invention to direct the user's attention to the ultimate destination of a minimized or maximized window.

It is a further objective of the present invention to provide a pleasing effect as the state of a user interface object is being changed, e.g. the object is being repositioned or resized.

The above-identified and other objectives are achieved by obtaining information relating to first and second on-screen positions of a window, defining a set of curves which connect the first and the second window positions, and then repeatedly scaling and repositioning the first window in such a way that it appears to slide through the curves from the first window position to the second window position. The visual effect of the present invention provides a smooth, aesthetically pleasing effect, during the process of maximizing and minimizing a window, or hiding and restoring a window, which also assists the user in associating a minimized window with the corresponding maximized window as the user can visually follow the transition from one to the other.

As an object such as a window moves from the first to the second position, the rate of translation is controlled in a non-linear manner to provide a visually pleasing effect. In one embodiment, the object accelerates and then decelerates as it moves. The rate of acceleration and deceleration is time-based, so that the same type of effect is achieved on all computers, independent of their respective processor speeds.

Further features of the invention, the advantages offered thereby are explained in greater detail herein after with reference to specific embodiments illustrated in the accompanying drawings.

DETAILED DESCRIPTION OF THE PREFERRED EMBODIMENTS

In the following description, for the purpose of explanation and not limitation, certain details are set forth, such as particular techniques, steps, and system components, in order to provide a thorough understanding of the present invention. However, it will be apparent to those skilled in the art that the present invention may be practiced in other embodiments that depart from these details. In some instances, specific detailed descriptions of well-known concepts and methods have been omitted so as not to obscure the description of the present invention.

Figure 1:
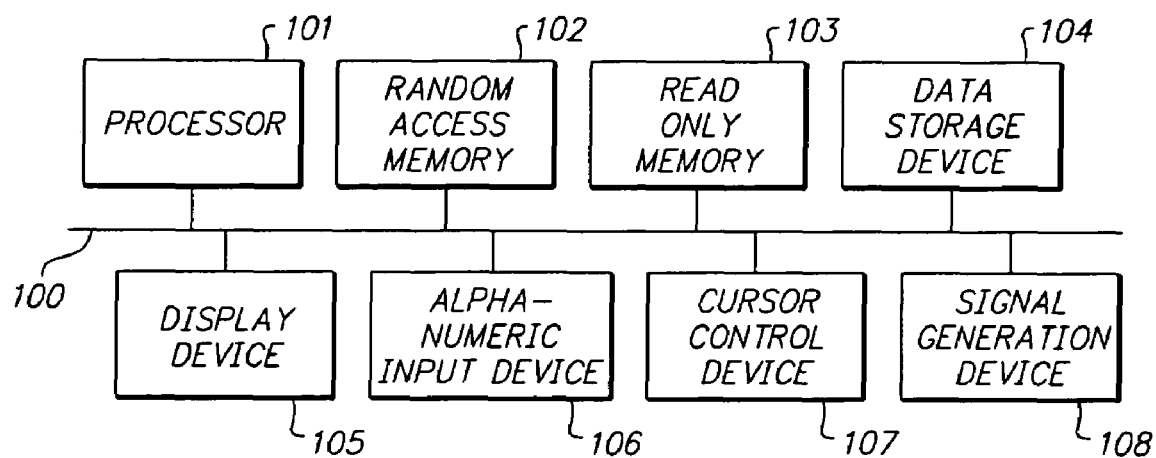
FIG. 1 shows a general computer system on which the present invention may be implemented.

Exemplary embodiments of the present invention may, for example, be implemented on an Apple Macintosh® computer system. In particular, the management of windows can be used with the tool described in U.S. application No. Ser. 09/467,074, filed Dec. 20, 1999, and entitled "User Interface for Providing Consolidation and Access," the disclosure of which is incorporated herein by reference. However, it will be readily appreciated by those skilled in the art that the techniques described herein may be implemented on any of a number of computer systems. In general, such computer systems, as illustrated in FIG. 1, comprise a bus 100 for communicating information, a processor 101 coupled with the bus for processing information and instructions, a random access memory 102 coupled with the bus 100 for storing information and instructions for the processor 101, a read only memory 103 coupled with the bus 100 for storing static information and instructions for the processor 101, a data storage device 104 such as a magnetic disk and disk drive or CD ROM drive coupled with the bus 100 for storing information and instructions, a display device 105 coupled to the bus 100 for displaying information to the computer user, an alpha-numeric input device 106 including alpha-numeric and function keys coupled to the bus 100 for communication information and command selections to the processor 101, a cursor control device 107 coupled to the bus for communicating information and command selections to the processor 101, and a signal generation device 108 coupled to the bus 100 for communicating command selection to the processor 101.

FIGS. 2A-2F graphically illustrate a technique for minimizing and maximizing a user interface object, e.g. a window, in accordance with an exemplary embodiment of the present invention. More specifically, FIGS. 2A-2F present the visual effect that occurs during the minimizing and repositioning of a window 200 from a first window position 210 to a second window position 220, where the window 200 is minimized, that is, reduced in size to a miniaturized representation 250. It will be understood that the miniaturized window representation 250 may, for example, be an icon representation or, alternatively, a smaller version of the original window 200. The miniaturized representation 250 can be one of multiple tiles 260 in a userbar 270 of the type described in previously cited application Ser. No. 09/467, 074, for example.

Figure 2A:
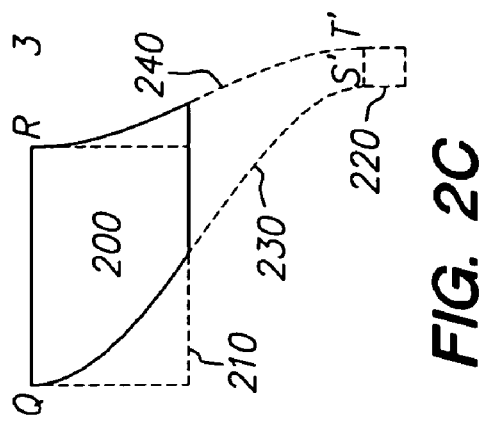
FIGS. 2A-2F illustrate a technique for minimizing and maximizing a window in accordance with exemplary embodiments of the present invention.
Figure 2B:
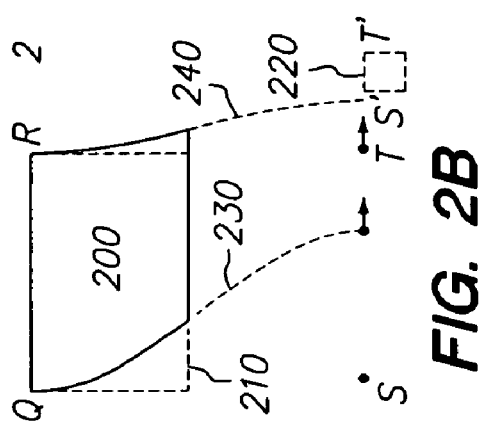
Figure 2C:
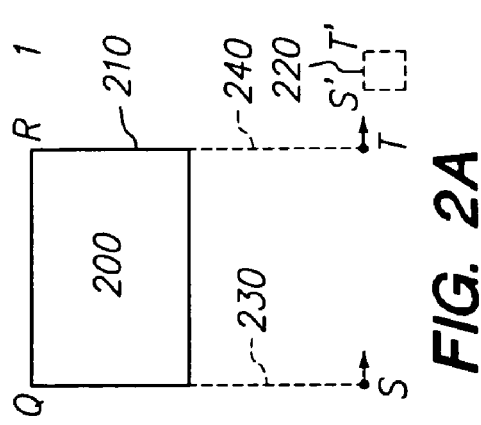
Figure 2D:
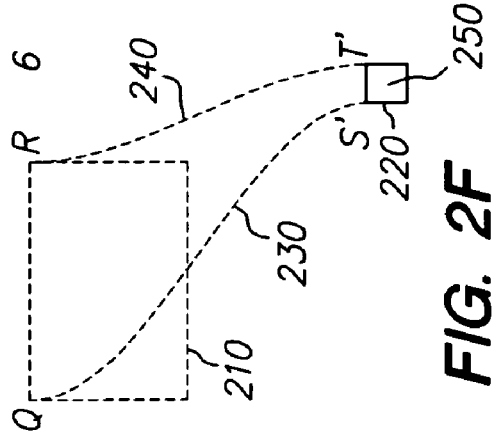
Figure 2E:
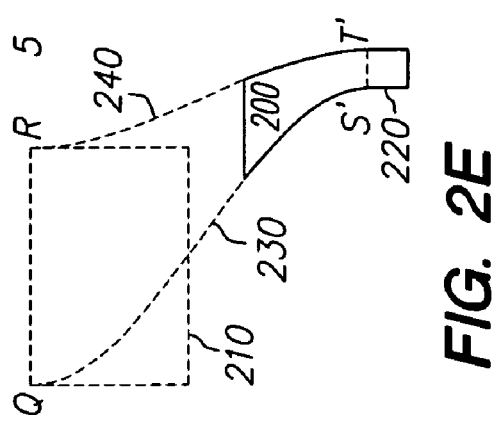
Figure 2F:
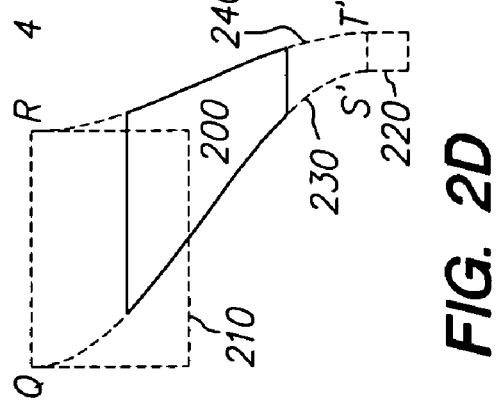

To facilitate the explanation of the visual effect illustrated in FIGS. 2A-2F, the technique is divided into a first Phase A and a second Phase B. FIGS. 2A-2C illustrate the events associated with Phase A. FIGS. 2D-2F illustrate the events associated with Phase B.

During a first event, as shown in FIG. 2A, location information defining a first window position 210 and a second window position 220 is obtained. Two curves 230, 240 having amplitudes initially set equal to zero (0), are formed as shown, wherein the two curves 230,240 originate from points Q and R respectively, and terminate at points S and T, respectively. These curves 230, 240 are preferably invisible to the user. In the embodiment shown in FIGS. 2A-2F, points Q and R, from which the two curves 230,240 originate, are selected because they are the points on the corners of the first window position 210, which are most remote from the second window position 220, thereby creating a more dramatic effect in which the window 200 is scaled and moved from the first position 210 to the second position 220. However, the points Q and R, from which the two curves 230,240 originate, can be selected as the points on the corners of the first window position 210 closest to the second window position 220, which would require a shorter set of curves 230,240, and would not require the scaling steps shown in FIGS. 2B-2C.

During a second and third event, as shown in FIGS. 2B-2C, the amplitudes of the curves 230,240 are adjusted until the curves 230,240 extend from points Q and R, which are associated with the first window position 210, to points S' and T', which are associated with the second window position 220. As one skilled in the art will appreciate, the curves 230,240 may be defined by any of a variety of different functions. In the example illustrated in FIGS. 2A-2F, the curves 230 and 240 are represented by sinusoidal functions. The basic equation defining curves 230,240 is, therefore, given by equation (1) below:

$$y = A \sin(x) \quad (1)$$

where x represents the length along the initial curves 230, 240 represented by segments QS and RT, shown in FIG. 2A, and where y represents the dimension perpendicular to these segments, in the direction from the points S and T to S' and T', wherein x ranges between $-\pi/2$ and $+\pi/2$ in radians. A is the amplitude which is, for curve 230, increased from zero (0) to a value given by equation (2) below:

$$A = 0.5 * S\,S' \quad (2)$$

where S S' represents the length along the line connecting point S and point S'. The amplitude A for curve 240 is increased from zero (0) to a value given by equation (3) below:

$$A = 0.5 * T\,T' \quad (3)$$

where T T' represents the length along the line connecting point T and point T'. As the amplitude A of the curves 230,240 is adjusted, the window 200 is scaled to fit within the curves, as shown in FIGS. 2B and 2C, such that the outer edges are transformed to conform with the adjusted position of the curves 230,240, and the remainder of the image is scaled corresponding to the transformation of the edges.

Scaling the image associated with the window 200, as shown in FIGS. 2B and 2C, may be accomplished by operating on each scan line of the image in a variety of ways. One technique for scaling the image involves filtering the scan lines by averaging adjacent pixels as the size of each scan line decreases. This technique yields a smooth transition in pixel luminance, which is pleasing to the eye. An alternative way of scaling the scan lines is to remove interposing pixels until each line is the correct size. Removing pixels is less processor intensive; however, this alternative technique does not typically produce the smooth transition that is obtained using the averaging technique described above. A variety of other well-known filtering techniques may be used to scale the scan lines, which would be apparent to those skilled in the art, without departing from the spirit of the invention.

While phase A involves defining the curves 230,240 and scaling the window 200 to fit within the curves 230,240, phase B involves moving the scaled window 200 to a second window position 220. As shown in FIGS. 2D-2F, the window 200 appears to slide towards the second position 220. One way of accomplishing this apparent sliding motion is to determine the scaled length of each scan line, as defined by a corresponding distance between curves 230,240, as the scan lines are shifted along a path in the direction from the first window position 210 to the second window position 220, and to scale the scan lines to fit between a corresponding distance between curves 230,240 in transitioning from the first window position 210 to the second window position 220. The scaling of each scan line may be accomplished using the pixel averaging or pixel removing techniques mentioned above. In addition, each scan line is moved and scaled in unison with the other scan lines, which creates the appearance that the window 200 is sliding between the curves 230,240 towards its final position 220.

The sixth event depicted in FIG. 2F represents the completion of the window minimization process, where the window 200 has fully completed its apparent sliding motion from the first window position 210 to the second window position 220, and wherein the miniaturized representation of the window 200 is shown as a tile 250 in the userbar 270. As stated previously, the tile 250 may be a scaled-down version of the original window 200, or an entirely different image, such as an icon.

A variety of techniques may be used to transform an image to an icon, which may be used to represent the window in its miniaturized form 250, as shown in FIG. 2F. One such technique allows the scan lines associated with the image being minimized to reach a final location within the second position 220 and thereafter disappear, leaving in their place a corresponding scan line associated with the icon. In this way, the forming of the icon gives an appearance similar to filling up a container with a liquid. A variety of other techniques for transforming an image to an icon apparent to those of ordinary skill in the art could be employed without departing from the spirit of the present invention.

After the window has been minimized, it may be restored to its original size and position 210 by reversing the events depicted in FIGS. 2A-2F. In accordance with one embodiment of the present invention, the operating system retains the values associated with curves 230,240 in memory. Accordingly, there is no need to recalculate the curves in restoring the window 200 to its original size and position 210 from the position 220 of its miniaturized representation 250.

FIGS. 3A-3F show a number of events associated with a technique for restoring a hidden window 300 in accordance with exemplary embodiments of the present invention. In FIGS. 3A-3F, a hidden window 300 is represented by a title bar 310. One skilled in the art will appreciate, however, that the hidden window may be represented by items other than a title bar, such as, an icon, a thumbnail, etc. Upon restoration of the window 300, the window 300 occupies a window position 320.

Figure 3A:
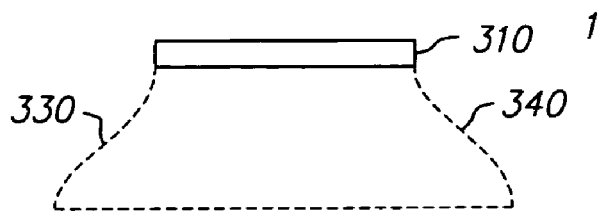
FIGS. 3A-3F illustrate a technique for restoring and hiding a window in accordance with exemplary embodiments of the present invention.

In a first event depicted in FIG. 3A, curves 330,340 are defined, wherein curves 330,340 connect the title bar 310 and the window position 320 by a smooth, continuous curve as shown. The curves 330,340 are preferably invisible to the user. Again, the curves may be defined by a variety of functions. In the present example, the curves 330,340 are defined by a half sine wave function. Unlike curves 230,240 illustrated in FIGS. 2A-2F, curves 330,340 appear inverted (i.e., out-of-phase by π radians) with respect to each other. However, one skilled in the art will recognize that the embodiment shown in FIGS. 3A-3F could employ curves that are in-phase with respect to each other, with or without the same amplitude.

Figure 3B:
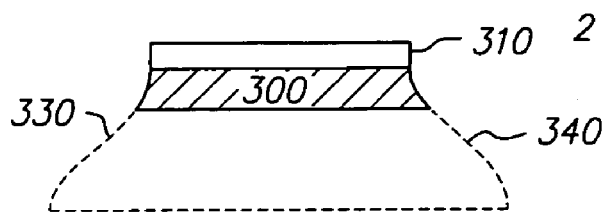
Figure 3C:
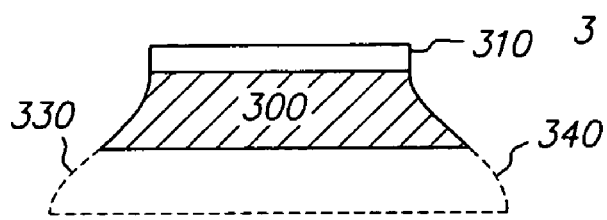
Figure 3D:
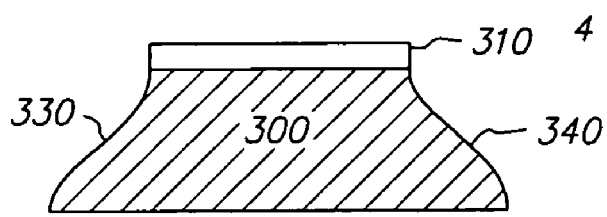

During a second and third event, as shown in FIGS. 3B-3C, the window 200 appears to slide from behind the title bar 310 in a manner similar to the sliding of window 200 described above in conjunction with FIGS. 2D-2F. The window 300 continues to slide one scan line at a time, where each scan line is continuously scaled in accordance with a corresponding distance between the curves 330,340, until the entire image associated with window 300 is completely in view, as exemplified by the fourth event illustrated in FIG. 3D. Again, scaling the scan lines may be achieved by implementing filtering techniques, such as the pixel averaging or pixel removing techniques described above.

Figure 3E:
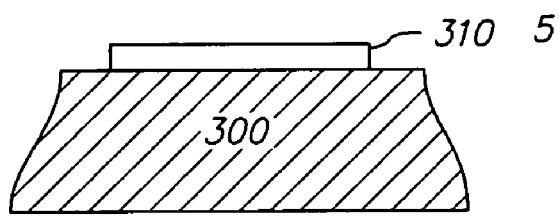
Figure 3F:
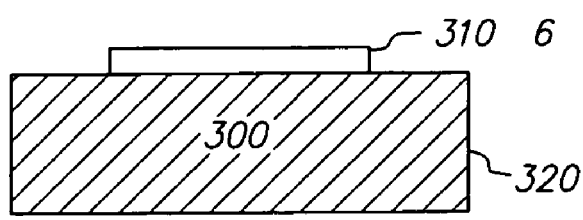

The fifth and sixth events, depicted in FIGS. 3E-3F, show that when the scaled image is completely in view, the amplitudes of the curves 330,340 are gradually attenuated to zero (0), until they form the two sides of the window 300. As the curves 330,340 are being adjusted, the image of the window 300 is scaled accordingly so that it continues to fit exactly within the curves 330,340. The scan lines may be scaled to fit within the curves 330,340 in accordance with a number of techniques, such as, for example, an extrapolation technique that in a manner that is the reverse of the pixel averaging and/or pixel removing techniques described above.

The events depicted in FIGS. 3A-3F could also be implemented in reverse, thus providing a way to hide the window 300, for example, behind the title bar 310. As in the previous example, the values defining the curves 330,340 may be saved so that they may be easily reused by the operating system when hiding the window 300.

Figure 4A:
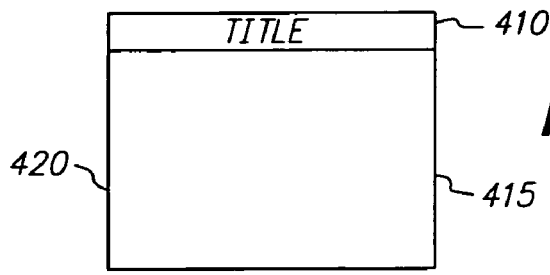
FIGS. 4A-4F illustrate an alternative technique for restoring and hiding a window in accordance with exemplary embodiments of the present invention.
Figure 4B:
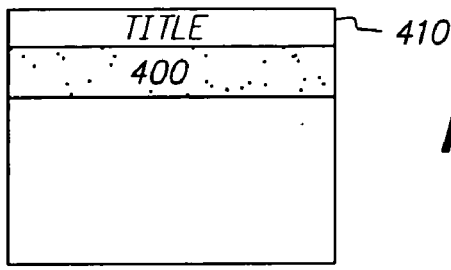
Figure 4C:
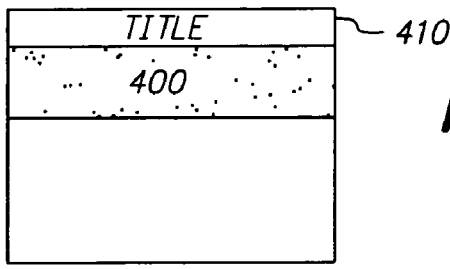
Figure 4D:
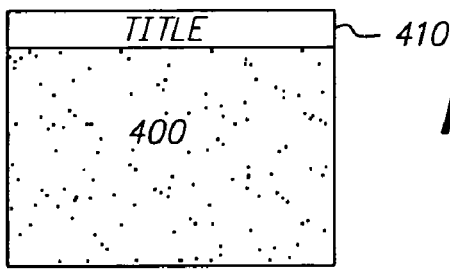
Figure 4E:
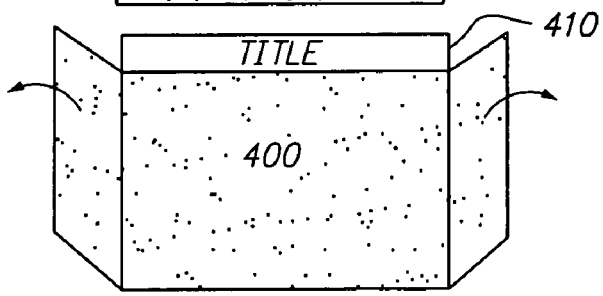
Figure 4F:
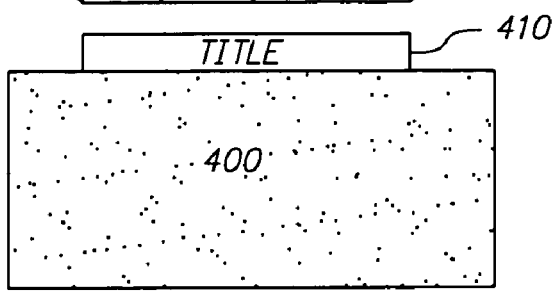

A variety of alternative embodiments involving the restoration of a window, similar to the embodiment illustrated in FIGS. 3A-3F, may be realized. FIGS. 4A-4F illustrate one such alternative. In FIGS. 4A-4C, an initially hidden window 400 is restored from behind a title bar 410 in such a way that it appears to drop down from behind the title bar 410 between the curves 415, 420, which have an amplitude, in this instance, of zero (0). When the window 400 is fully extended, as shown in FIG. 4D, the window 400 appears to "unfold", as illustrated in FIGS. 4E and 4F.

Figure 5A:
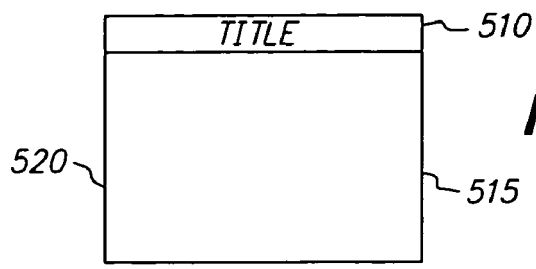
FIGS. 5A-5F illustrate an additional alternative technique for restoring and hiding a window in accordance with exemplary embodiments of the present invention.
Figure 5B:
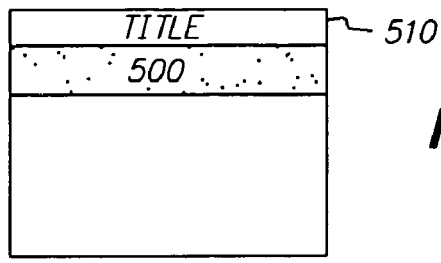
Figure 5C:
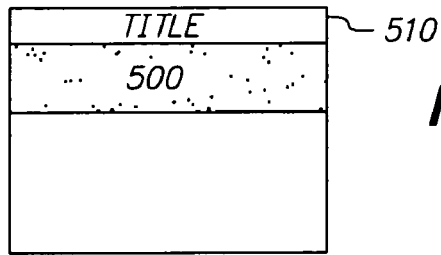
Figure 5D:
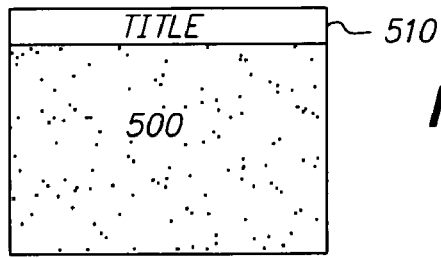
Figure 5E:
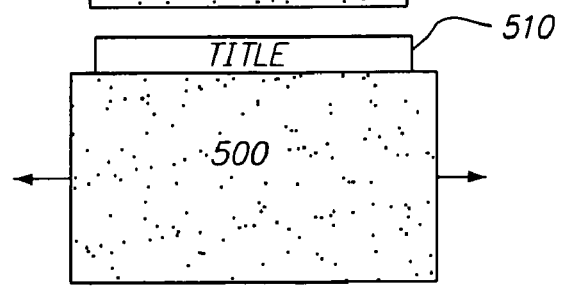
Figure 5F:
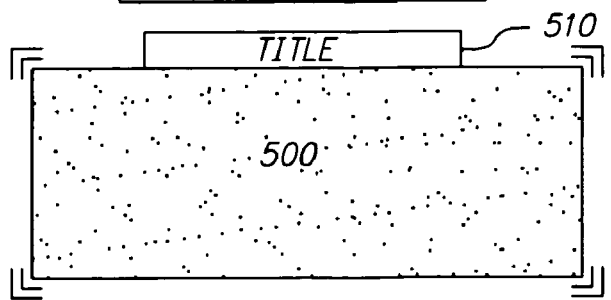

Figures 5A-5F illustrate still another alternative embodiment. In this case, an initially hidden window 500 is restored in such a way that it appears to drop down from behind the title bar 510, as shown in FIGS. 5A-5C. Once the window 500 is fully extended, as shown in FIG. 5D, the window 500 is expanded horizontally, as shown in FIG. 5E, wherein it appears as though the window undergoes a spring-like vacillation, or bouncing effect, illustrated in FIG. 5F, until it reaches a steady-state as a full-sized window.

Figure 6:
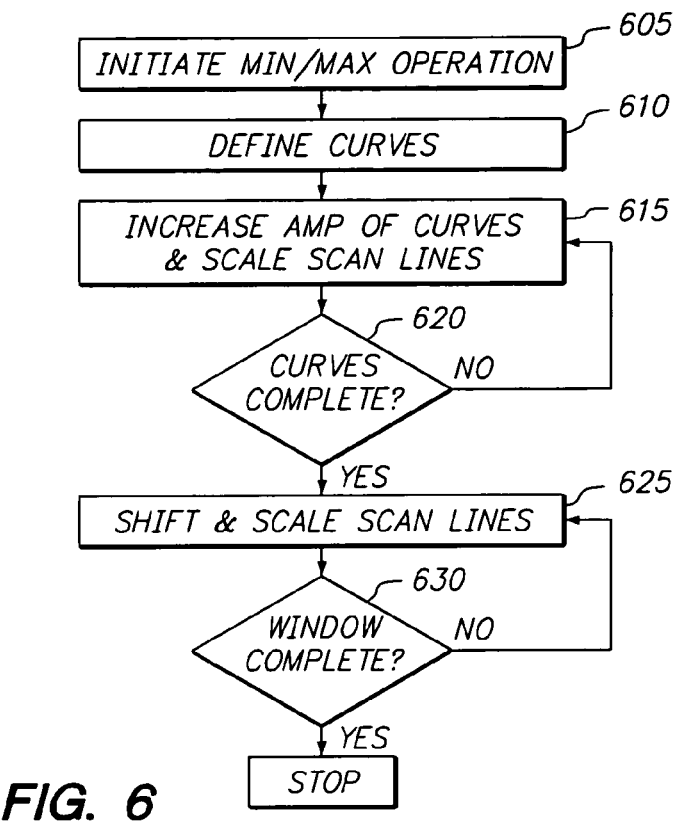
FIG. 6 is a flow chart depicting a method for minimizing and maximizing windows in accordance with exemplary embodiments of the present invention.

FIG. 6 depicts the steps associated with a method that might be employed to implement, for example, the window minimization/maximization technique shown in FIGS. 2A-2F. As shown in step 605, the method begins with an initiation step. Typically, this is accomplished by the user through the selection of an on-screen button, using a cursor control device, which may be physically associated with the window being minimized/maximized or by the user depressing one or more keys on a keyboard.

In step 610, a pair of curves is defined. In FIG. 2A, these curves 230,240 are designated QS and RT. As previously stated, the curves may be defined by any number of functions. In the examples described above, the curves are defined by half sine wave functions. The curves initially lie along the edges of the window being minimized/maximized, with an amplitude of zero (0).

During step 615, the amplitude of each sine wave curve is incremented, such that the points designated Q and R, which are associated with the present location of the window, appear as though they remain fixed, while the points designated S and T, as illustrated in FIGS. 2A-2C, appear to shift horizontally towards the points designated S' and T', which are associated with the desired location of the window. As the amplitude of each curve is incremented, the scan lines associated with the window are scaled so that they fit within the continuously changing curves. The various techniques that may be employed to scale the scan lines are described above.

After incrementing the amplitude of each curve and scaling the scan lines accordingly, a determination is made, as illustrated by decision step 620, as to whether the amplitude of each curve has been sufficiently increased such that S' and T' are points along each curve respectively. If, as shown by the "NO" path out of decision step 620, the amplitudes have not yet been increased sufficiently, step 615 is repeated. If, however, the amplitudes have been increased sufficiently, as shown by the "YES" path out of decision step 620, then the window begins to move toward its desired location.

In accordance with step 625, the window is moved toward the desired location through a process that involves shifting the window, scan line by scan line, toward the desired location. As the window is being shifted, the scan lines are being continuously scaled so that the length of each scan line equals a corresponding distance between the curves. This creates the appearance that the window is sliding towards the desired location between the curves.

Eventually, each scan line associated with the window reaches the desired location. Thus, as the scan lines are being shifted and scaled, it is necessary to determine whether they have been fully shifted into place such that the window now occupies the desired location. This determination is made in accordance with decision step 630. If it is determined that the scan lines are not fully in place, in accordance with the "NO" path out of decision step 630, step 625 is repeated. If, however, it is determined that the scan lines are fully in place, and the window is now completely occupying the desired location, in accordance with the "YES" path out of decision step 625, the process is complete and the method may be terminated.

Figure 7:
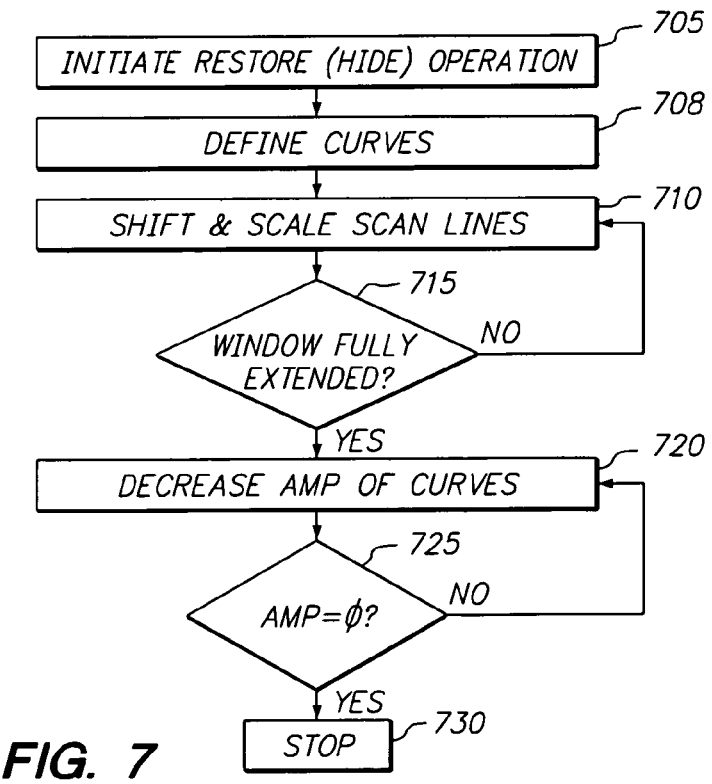
FIG. 7 is a flow chart depicting a method for restoring and hiding a window in accordance with exemplary embodiments of the present invention.

FIG. 7 depicts the steps associated with a method that might be employed to implement, for example, the window restoration technique shown in FIGS. 3A-3F. As shown in step 705, the method begins with an initiation step. As in the previously described method, the user may initiate the method by selecting an on-screen button or depressing one or more keys on a keyboard.

In step 708, a pair of curves is defined. In FIG. 3A, these are identified as curves 330 and 340. The curves are, once again, defined in the present example by half sine wave functions. However, the sine wave functions here have the same amplitudes, although they are inverted with respect to each other, that is, they appear as though they are out-of-phase with each other by π radians. In the previous example, the two curves appeared to be in-phase with respect to each other, but with different amplitudes.

During the next step 710, the scan lines associated with the window, for example, window 300 illustrated in FIGS. 3B-3F, are shifted and scaled so that they appear to slide from beneath a minimized window representation, such as a title bar, icon or thumbnail, and between the two curves. After shifting and scaling each scan line, a determination is made as to whether the window has been fully extended, as shown in decision step 715. If, as shown by the "NO" path out of decision step 715, it is determined that the window is not yet fully extended, step 710 is repeated. However, if it is determined that the window is fully extended, as shown by the "YES" path out of decision step 715, then the amplitude associated with the curves is decreased, as shown in step 720.

After decreasing the amplitude associated with the curves, a determination is made as to whether the window is fully expanded. This occurs when the amplitude of the curves reaches zero (0). This determination is made in accordance with decision step 725. If the amplitude of the curves is not yet zero (0), as shown by the "NO" path out of decision step 725, then step 720 is repeated. If, however, the amplitude of the curves is zero (0), the window is fully expanded and the method may be terminated, as shown by the "YES" path out of decision step 725 to the termination step 730.

In accordance with another aspect of the invention, the movement of user interface objects on the desktop, such as windows, icons, tiles, etc., is carried out in a time-based manner that provides an interesting and pleasing effect. Further, this effect is independent of processor speed, so that a consistent look is presented regardless of the model of computer with which the user interface is used.

In an embodiment of this aspect of the invention, a non-linear translation rate is employed, wherein the object appears to move slowly at the beginning and end of its path of movement, and faster during the middle portion of the movement. Thus, for instance, in the example of FIGS. 2A-2F, as the window 200 begins its downward movement from the state of FIG. 2C, it begins slowly, then appears to move faster as it passes through the state of FIG. 2D, and finally slows down again as it settles into its final position 220 shown in FIG. 2F.

Figure 8:
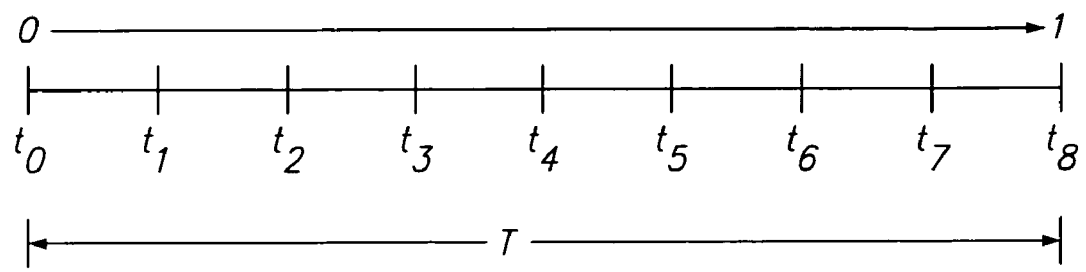
FIG. 8 is a time line for the duration of a movement animation.
Figure 9:
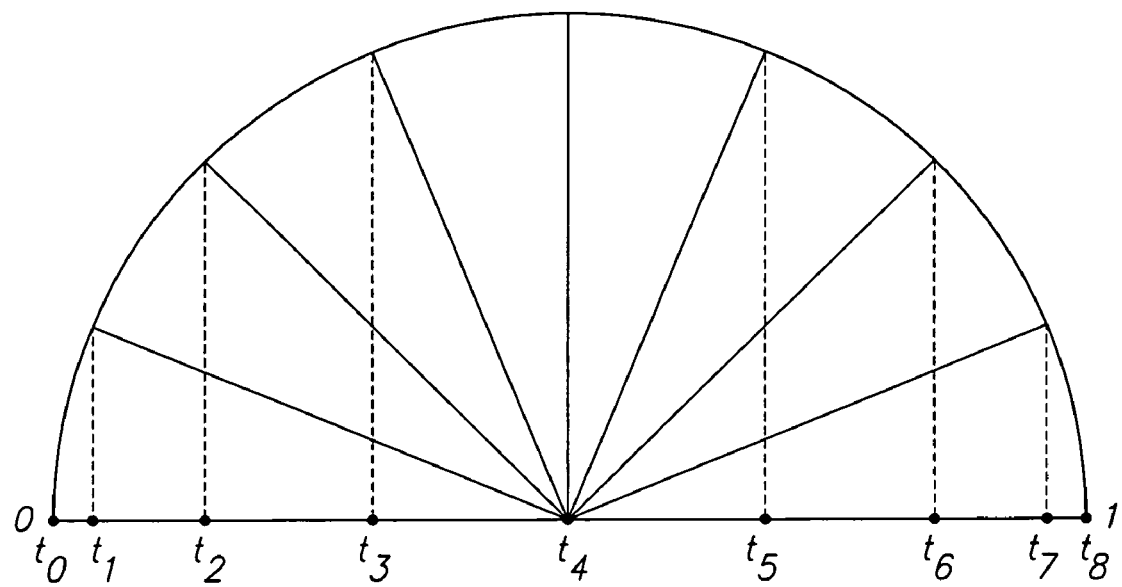
FIG. 9 is an illustration of the incremental movement that occurs when a sinusoidal function is employed for the movement animation.

In a preferred embodiment, a sinusoidal function is employed to provide this effect of acceleration and deceleration during the movement of the object. Referring to FIG. 8, the total length of the translation that is to take place is depicted in a range of 0 to 1, and occurs over a duration of time T. Thus, in the example of FIGS. 2A-2F, the total vertical translation is equal to the distance S-Q. The amount that the object moves during each increment of time in this interval, e.g. every 30 milliseconds, can be viewed relative to movement along the periphery of a semicircle in equiangular increments. For instance, if the interval T is divided into 8 segments, each interval corresponds to an arc of 22.5°, as shown in FIG. 9. When the end point of each arc is projected onto a linear axis, i.e. the diameter of the semicircle, the results indicate the amount of linear translation that takes place during each interval. As can be seen, the amount of movement that takes place during the first interval of time, $t_1$-$t_0$, is significantly less than the distance traveled during the middle periods, e.g. $t_4$-$t_3$ and $t_5$-$t_4$. Similarly, the amount of movement in the later periods are also less than during the middle periods. As a result, the object appears to first accelerate and then decelerate over the total range of its motion. The semicircle, therefore, represents a non-constant velocity function over the path of movement along the axis.

To determine the instantaneous position of the object during movement in accordance with the foregoing approach, the following values are defined for movement in a direction of interest, e.g. along the x axis:

$x_{start}$—starting position of a reference point on the object (e.g. the upper left corner Q of the window illustrated in FIG. 2A)

$x_{end}$—final position of the reference point on the object (e.g. the point S')

$t_{start}$—starting time for the translation

T—total duration for the translation

Once these values have been defined, the elapsed time is calculated as:

$$t_{elapsed} = t_{now} - t_{start} \qquad (1)$$

where $t_{now}$ is the current time. Using this value, a distance factor F is computed as follows:

$$F = 0.5 - [0.5 \cos(\pi * t_{elapsed}/T)] \qquad (2)$$

This calculation results in a value in the range of 0 to 1, i.e. a point along the linear axis. This value is then used to determine the instantaneous position of the object, as follows:

$$x_{now} = x_{start} + (x_{end} - x_{start}) * F \qquad (3)$$

The procedure of Equations 1-3 is repeated during the period of time T, until the object has reached the final position.

The foregoing example has been provided for translation along the x axis. The same approach can be employed for translation along the y axis, if translation in that direction is to be depicted.

A particular advantage of this technique for translating objects is the fact that it is based on time, and is independent of the processor speed of the computer on which the operating system is being run. Hence, a consistent appearance will be associated with the user interface across all models of computers, rather than appearing relatively sluggish on older, slower computers or too fast to be perceived on newer, faster computers.

While the preceding example has been particularly described with reference to the movement of a window, it will be appreciated that it is not limited to such. Rather, the non-linear translation can be applied to any object which is automatically moved in a user interface. For instance, if a user removes one of the tiles 260 in the userbar 270, or maximizes it into an open window, the other tiles can move horizontally to fill the gap created by the removed tile. Likewise, if a new tile is inserted in the userbar, or the relative positions of the tiles are changed, the existing tiles can move away from the tile being inserted to provide space for it to be accommodated. The movement of each tile can be controlled in accordance with the foregoing technique, to create a pleasing effect. Similarly, the dropping down of menus and any other type of movement animation that is automatically performed in a user interface can employ this effect.

Although a sinusoidal function has been identified since it produces a particularly interesting effect, any other function representing a velocity which increases and/or decreases over time, particularly a non-linear function, can be employed to produce a desired effect during the movement of the object.

It will be appreciated by those of ordinary skill in the art that the present invention can be embodied in other specific forms without departing from the spirit of the invention or essential characteristics thereof. For example, the invention has been described using curves, between which an image is scaled and along which an image is slid from a first position to a second position; however, the reference to "curves" may include the use of any kind of curve, including straight lines. Furthermore, the embodiments described show movement in the vertical direction on a computer screen; however, it is anticipated that the present invention may be implemented in any direction on a computer screen. Moreover, multiple scaling effects may be utilized in scaling and sliding the image that would be within the skill of those skilled in the art for enhancing the aesthetic effect of the transition described without departing from the spirit of the invention.

The presently disclosed embodiments are therefore considered in all respects to be illustrative and not restrictive. The scope of the invention is indicated by the appended claims, rather than the foregoing description, and all changes that come within the meaning and range of equivalents thereof are intended to be embraced therein.

What is claimed is:

1. A method for moving an object in a graphical user interface, comprising the steps of:
   a) determining a path of movement for the object along at least one axis, and a period of time for the movement along said path;
   b) establishing a non-constant velocity function along said axis for said period of time;
   c) calculating an instantaneous position for the object along said path in accordance with said function and the relationship of a current time value to said period of time;
   d) displaying said object at said calculated position; and
   e) iteratively repeating steps (c) and (d) during said period of time.

2. The method of claim 1 wherein said function is a non-linear function.

3. The method of claim 2 wherein said function is a sinusoidal function.

4. The method of claim 1 wherein said calculating step comprises the steps of:
   determining the amount of time that has elapsed since the beginning of said period of time;
   calculating the ratio of said elapsed amount of time to the total duration of said period of time;
   applying said ratio to said function to determine a translation factor; and
   using said translation factor to determine the instantaneous position of the object along said path.

5. A method for minimizing a window in a graphical user interface, comprising the steps of:
   in response to a command to minimize a window positioned at a current location, selecting a destination location for the window;
   displaying said window at sequential positions along a path from said current location to said destination location at equal increments of time, such that the distance between successive positions varies in accordance with a non-linear function so that the object appears to be moving at a changing velocity.

6. The method of claim 5 wherein said function is a sinusoidal function, so that the object appears to accelerate and then decelerate along said path.

7. The method of claim 5, further including the step of scaling the size of said window at successive positions as it moves along said path.

8. A user interface for a computer, comprising:
   a display space within which objects are displayed; and
   means responsive to a user action that results in the removal of an object from a series of objects, said means causing other objects in said series to move toward the space occupied by the removed object, by displaying the other objects at different sequential positions during respective increments of time, such that the distance between successive positions varies in accordance with a non-linear function so that the objects appear to be moving at a changing velocity.

9. The user interface of claim 8 wherein said function is a sinusoidal function, so that the objects appear to accelerate and then decelerate as they move toward said space.

10. The user interface of claim 8 wherein said object being removed represents a window, and said user action is a command to open the window in the display space.

11. A user interface for a computer, comprising:
a display space within which objects are displayed; and
means responsive to a user action that results in the insertion of an object into a series of objects, said means causing other objects in said series to move away from the inserted object by displaying the other objects at different sequential positions during respective increments of time, such that the distance between successive positions varies in accordance with a non-linear function so that the objects appear to be moving at a changing velocity.

12. The user interface of claim 11 wherein said function is a sinusoidal function, so that said other objects appear to accelerate and then decelerate as they move away from the inserted object.

13. The user interface of claim 11 wherein said object is a window in said display space, and said user action is a command to minimize said window.

14. A computer-readable medium containing a program which executes the following steps:
a) displaying at least one object in a display space;
b) determining a path of movement for the object along at least one axis within the display space, and a period of time for the movement along said path;
c) establishing a non-constant velocity function along said axis for said period of time;
d) calculating an instantaneous position for the object along said path in accordance with said function and the relationship of a current time value to said period of time;
d) displaying said object at said calculated position; and
f) iteratively repeating steps (d) and (e) during said period of time.

15. The method of claim 14 wherein said function is a non-linear function.

16. The method of claim 15 wherein said function is a sinusoidal function.

17. A computer-readable medium containing a program which executes the following steps:
displaying at least one object at a first location in a display space;
selecting a second location for the object within said display space, and a period of time within which the object is to move from the first location to the second location;
displaying said object at sequential positions along a path from said first location to said second location at increments of time within said period, such that the distance between successive positions varies in accordance with a non-linear function so that the object appears to be moving at a changing velocity along said path.

18. The method of claim 17 wherein said function is a sinusoidal function, so that the object appears to accelerate and then decelerate along said path.

19. A user interface for a computer, comprising:
a display space within which an object is displayed at a first location; and
means responsive to a user action for selecting a second location to which said object is to be moved and a period of time during which the movement is to occur, and for moving said object from said first location to said second location at a non-linear rate of movement during said period of time.

20. The user interface of claim 19 wherein said non-linear rate is a sinusoidal function, so that the object appears to accelerate and then decelerate along a path from said first location to said second location.

21. The user interface of claim 19 wherein said user action is a command to minimize a window.

22. The user interface of claim 19 wherein said user action results in the removal of one object from a series of objects, and said means causes other objects in said series to move toward the space occupied by the removed object at said non-linear rate.

23. The user interface of claim 19 wherein said user action results in the insertion of an object into a series of objects, and said means causes other objects in said series to move away from the inserted object at said non-linear rate.

24. A computer having an operating system that includes a user interface which implements the following steps:
displaying an object at a first location within a display space;
selecting a second location to which said object is to be moved and a period of time during which the movement is to occur in response to a user action; and
moving said object from said first location to said second location at a non-linear rate of movement during said period of time.

25. The computer of claim 24 wherein said non-linear rate is a sinusoidal function, so that the object appears to accelerate and then decelerate along a path from said first location to said second location.

26. The computer of claim 24 wherein said user action is a command to minimize a window.

27. The computer of claim 24 wherein said user action results in the removal of one object from a series of objects, and said means causes other objects in said series to move toward the space occupied by the removed object at said non-linear rate.

28. The computer of claim 24 wherein said user action results in the insertion of an object into a series of objects, and said means causes other objects in said series to move away from the inserted object at said non-linear rate.

* * * * *

UNITED STATES PATENT AND TRADEMARK OFFICE
CERTIFICATE OF CORRECTION

| | |
|---|---|
| PATENT NO. | : 7,362,331 B2 |
| APPLICATION NO. | : 09/754147 |
| DATED | : April 22, 2008 |
| INVENTOR(S) | : Bas Ording |

It is certified that error appears in the above-identified patent and that said Letters Patent is hereby corrected as shown below:

On Title Page, insert Continuity Data information in Field (63) (Related U.S. Application Data): --This application is a CIP of 09/477,738 filed on Jan. 5, 2000, now U.S. Patent No. 6,396,520.--.

Column 11, line 15, (Claim 11) change "obiects" to --objects--.

Column 11, line 20, (Claim 11) change "obiects" to --objects--.

Signed and Sealed this

Twenty-first Day of October, 2008

JON W. DUDAS
*Director of the United States Patent and Trademark Office*